United States Patent [19]

Persson

[11] Patent Number: 5,578,908
[45] Date of Patent: Nov. 26, 1996

[54] PHASE CONTROL CIRCUIT HAVING INDEPENDENT HALF CYCLES

[75] Inventor: Eric G. Persson, Minnetonka, Minn.

[73] Assignee: Nicollet Technologies Corporation, Minneapolis, Minn.

[21] Appl. No.: 487,502

[22] Filed: Jun. 7, 1995

[51] Int. Cl.[6] .................................................. H05B 37/02
[52] U.S. Cl. ........................ 315/307; 315/194; 315/224; 363/23
[58] Field of Search .................................... 363/21, 23, 25, 363/28; 315/307, 224, 209 R, DIG. 5, 194

[56] References Cited

U.S. PATENT DOCUMENTS

| | | | |
|---|---|---|---|
| 3,199,020 | 8/1965 | Hilker | 323/89 |
| 3,319,154 | 5/1967 | Rudge | 323/48 |
| 3,922,595 | 11/1975 | Vieri | 363/54 |
| 4,286,193 | 8/1981 | King, Jr. et al. | 315/175 |
| 4,351,022 | 9/1982 | Dolland et al. | 363/87 |
| 4,663,569 | 5/1987 | Alley et al. | 315/175 |
| 4,742,276 | 5/1988 | Ku | 315/106 |
| 5,144,205 | 9/1992 | Motto et al. | 315/244 |
| 5,166,597 | 11/1992 | Larsen et al. | 323/215 |
| 5,233,273 | 8/1993 | Waki et al. | 315/224 |
| 5,327,047 | 7/1994 | Gershen | 315/194 |
| 5,374,875 | 12/1994 | Shackle et al. | 315/247 |
| 5,406,174 | 4/1995 | Slegers | 315/219 |
| 5,410,220 | 4/1995 | von Hertzen | 315/209 R |

OTHER PUBLICATIONS

"Control of Line–Frequency Controlled Rectifiers and Inverters," N. Mohan, T. M. Undeland, W. P. Robbins, *Power Electronics: Converters, Applications, and Design*, Copyright 1989 by John Wiley & Sons, Inc., pp. 42–45.

"Single–Phase Full–Wave Controller," S. B. Dewan, A. Straughen, *Power Semiconductor Circuits*, Copyright 1979 by John Wiley & Sons, Inc., pp. 160–161.

"Silicon Controlled Rectifiers," B. D. Wedlock, J. K. Roberge, *Electronic Components and Measurements*, Copyright 1969 by Prentice–Hall, Inc., Englewood Cliffs, NJ, pp. 329–332.

*Primary Examiner*—Robert Pascal
*Assistant Examiner*—David H. Vu
*Attorney, Agent, or Firm*—Westman, Champlin & Kelly, P.A.

[57] ABSTRACT

A phase control circuit according to the present invention is configured for connection between and AC source and an AC load. The AC source supplies an AC drive signal having a plurality of sequential positive and negative half cycles. The phase control circuit comprises first and second power switches coupled between the AC source and the AC load. The first power switch conducts current of the AC drive signal after a first phase delay during the positive half cycles. The second power switch conducts current of the AC drive signal after a second phase delay during the negative half cycles. A feedback balance circuit is coupled between the AC load and the first and second power switches. The feedback balance circuit determines a DC current component in the AC load and generates a phase delay correction signal as a function of the DC current component. At least one of the first and second phase delays is adjusted independently of the other phase delay as a function of the phase delay correction signal to limit the DC current component.

14 Claims, 2 Drawing Sheets

PHASE CONTROL CIRCUIT HAVING INDEPENDENT HALF CYCLES

CROSS-REFERENCE TO RELATED APPLICATION

Cross-reference is hereby made to U.S. patent application Ser. No. 08/487,503 of D. Kuusisto and E. Persson, entitled "Control Circuit For Gas Discharge Lamps," which is assigned to Nicollet Technologies Corporation and filed on even date herewith.

BACKGROUND OF THE INVENTION

The present invention is directed to a phase control circuit for adjusting the power delivered to an AC load. More specifically, the present invention is directed to a phase control circuit having independent control of each half cycle, which is particularly useful in controlling a gas discharge lamp.

Gas discharge lamps are used in a variety of applications. For example, mercury vapor lamps are used for ultraviolet (UV) curing of ink in printing presses, for curing furniture varnish, in germicide equipment for killing germs in food and its packaging, and for killing bacteria in medical operating rooms. Many other applications also exist.

A traditional circuit for controlling a mercury vapor lamp includes an AC power source which drives a primary side of a ballast transformer. A secondary side of the transformer is coupled to the lamp. The lamp includes a gas-filled tube with electrodes at each end of the tube. The secondary side of the transformer applies a voltage between the electrodes which accelerates electrons in the tube from one electrode toward the other. The electrons collide with gas atoms to produce positive ions and additional electrons. Since the current applied to the gas discharge lamp is alternating, the electrodes reverse polarity each half cycle.

Since the collisions between the electrons and the gas atoms generate additional electrons, an increase in the arc current causes the impedance of the lamp to decrease. This characteristic is known as "negative resistance." The lamp is unstable and current between the electrodes must be limited to avoid damaging the lamp. As a result, a typical control circuit includes a current limiting inductance coupled in series with the lamp. The inductance can either be a physically separate inductor or "built-in" to the transformer as a leakage inductance.

When the lamp is first started, the lamp requires a very large striking voltage to initiate an arc to ionize the gas in the lamp. The electrodes of the lamp are cold and there are almost no free electrons in the tube. The impedance of the lamp is therefore very high. The voltage required to initiate the arc exceeds that required to sustain the arc. For example, the ignition voltage may be 1,000 volts while the operating voltage may be 550 volts.

Lamp intensity adjustments have been made by providing a bank of capacitors in series with the lamp which are connected to one another in parallel through a plurality of mercury relay switches. The mercury relay switches are required to switch the high voltages (e.g. 1,000 volts) applied across the capacitor bank. The user changes the state of the switches to change the capacitance and thus the lamp intensity. The capacitor bank has several disadvantages. The capacitor bank is very large, expensive and unreliable. Also, the capacitor bank has a capacitance with only a few selectable magnitudes. This allows only a very coarse power adjustment. The mercury relay switches are expensive and in disfavor due to the environmental hazard presented by the mercury contained in the switches.

Lamp intensity adjustments have also been made by the use of tap-switching relays on the secondary side of the ballast transformer. This arrangement is also unreliable due to the high voltages present at the secondary side of the circuit.

SUMMARY OF THE INVENTION

A phase control circuit according to the present invention is configured for connection between and AC source and an AC load. The AC source supplies an AC drive signal having a plurality of sequential positive and negative half cycles. The phase control circuit comprises first and second power switches coupled between the AC source and the AC load. The first power switch conducts current of the AC drive signal after a first phase delay during the positive half cycles. The second power switch conducts current of the AC drive signal after a second phase delay during the negative half cycles. A feedback balance circuit is coupled between the AC load and the first and second power switches. The feedback balance circuit determines a DC current component in the AC load and generates a phase delay correction signal as a function of the DC current component. At least one of the first and second phase delays is adjusted independently of the other phase delay as a function of the phase delay correction signal to limit the DC current component.

The phase control circuit of the present invention is particularly useful in controlling power delivered to non-linear, unstable loads, such as gas discharge lamps, in which DC current components must be limited. The phase control circuit provides smooth, continuous power control and eliminates a need for a capacitor in series with the AC load, which is typically expensive and unreliable in high voltage applications.

In one embodiment, the first and second power switches include first and second anti-parallel connected thyristors coupled between the AC source and the AC load. Each thyristor includes a gate which is controlled by a corresponding trigger circuit. The trigger circuit provides a trigger signal at a selected phase delay during each half cycle which triggers the thyristor to a conducting state at a variable time each cycle. This allows proportional control over the average AC power delivered to the load. The feedback circuit includes a current sensor coupled in series with the AC load. An integrator is coupled to the current sensor for integrating the AC current delivered to the load. The integrator includes an output which is representative of the DC current component.

At the end of each cycle, the AC load will have conducted current in two directions, with one direction during the positive half cycle and one direction during the negative half cycle. Any imbalance in the current delivered during that cycle will be reflected in the output of the integrator. The output of the integrator is used as the phase delay correction signal and is used to increase or reduce one of the first and second phase delays to compensate for the imbalance in the integrator output. The phase control circuit of the present invention therefore forces the positive and negative half cycles to conduct equally, thereby reducing or eliminating any DC current component delivered to the load over time.

DETAILED DESCRIPTION OF THE PREFERRED EMBODIMENTS

Figure 1:
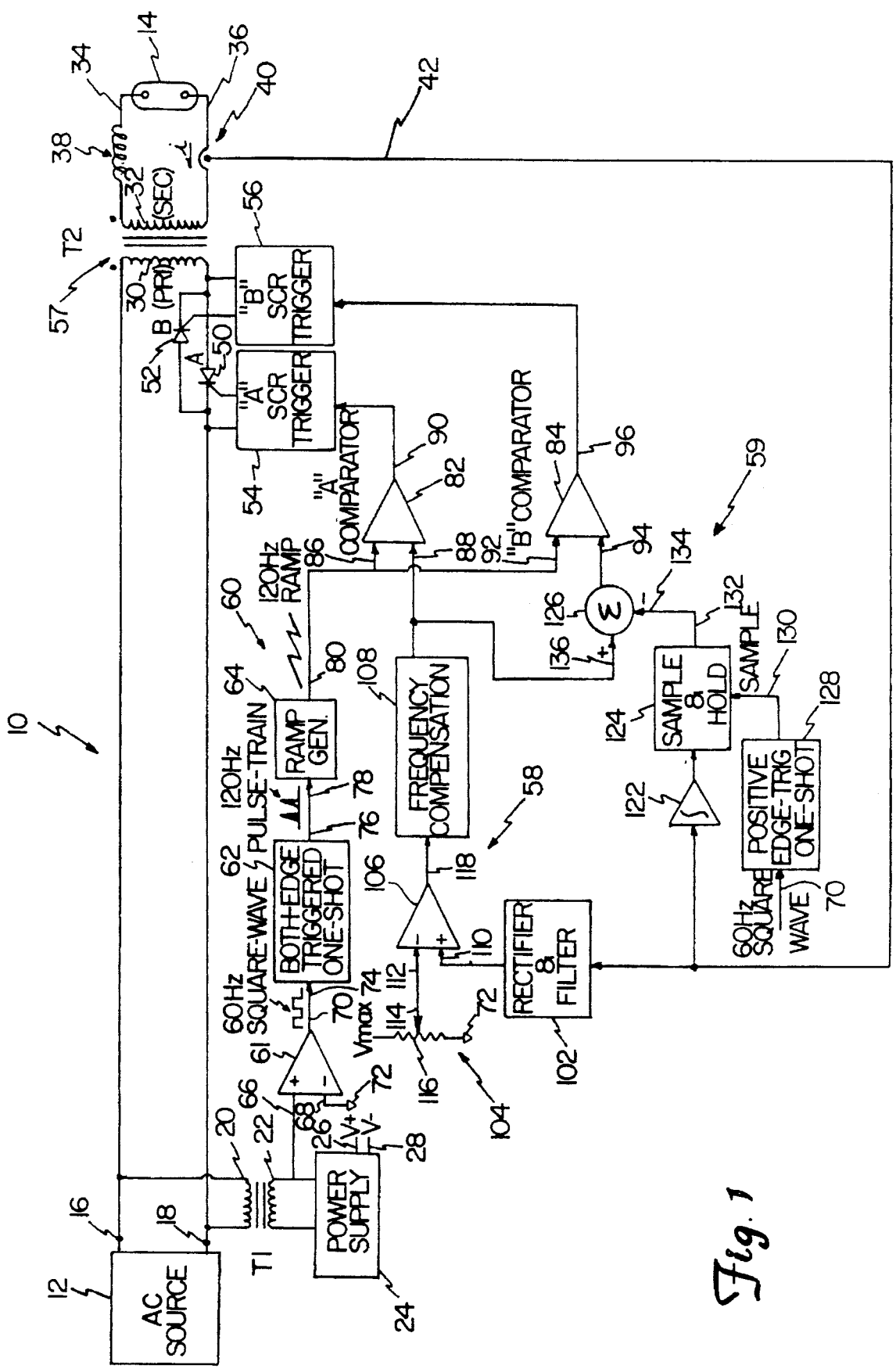
FIG. 1 is a diagram of a phase control circuit for a gas discharge lamp, according to the present invention.

FIG. 1 is a diagram of a phase control circuit according to the present invention which solves these problems by independently adjusting the phase angle for each half cycle to cancel out any net DC current component delivered to the lamp. The circuit monitors the actual lamp current and adjusts a balance between the phase angles to force the average current to zero such that there is no DC current component.

Because of the non-linear nature of high intensity gas discharge lamps, it has been found that conventional phase control will not work properly without a capacitor coupled in series with the lamp. Any slight DC imbalance in the current delivered to the lamp causes the entire current-voltage (I–V) operating curve of the lamp to shift, so that the breakdown voltage of the lamp is no longer symmetrical in the positive and negative directions. The lamp becomes a rectifier, with a low breakdown voltage in one direction and a very high breakdown voltage in the other direction. Since conventional phase control provides symmetrical voltage on each half cycle of the current source, only one half cycle will actually conduct through the lamp and the other half cycle will not, resulting in a net DC current component delivered to the lamp.

This half-wave DC mode will result in numerous problems, like gas migration in the lamp, lower effective lamp power and transformer saturation problems in the power distribution network. Although a capacitor may be used in series with the lamp to block DC current components, these capacitors are typically expensive and unreliable. The phase control circuit of the present invention provides smooth, continuous control over lamp intensity without the need of a capacitor to block DC current components.

As shown in FIG. 1, phase control circuit 10 is coupled between an AC source 12 and a gas discharge lamp 14. AC source 12 provides an AC drive signal, such as a utility line voltage, which has a plurality of sequential positive and negative half cycles. The AC drive signal can have any frequency such as 60 Hz. AC source 12 is connected to input terminals 16 and 18. A control transformer T1 has a primary winding 20 coupled to input terminals 16 and 18, and a secondary winding 22 coupled to a DC power supply circuit 24. DC power supply circuit 24 is a conventional power supply which, in one embodiment, provides a regulated V+ and V– voltage on terminals 26 and 28 for powering the various components in phase control circuit 10.

Phase control circuit 10 further includes a power transformer T2 having a primary winding 30 and a secondary winding 32. Primary winding 30 is coupled to input terminals 16 and 18 for receiving the AC drive signal from AC source 12. Secondary winding 32 is coupled to gas discharge lamp 14 through output terminals 34 and 36. A current limiting inductor 38 is coupled in series with gas discharge lamp 14. Inductor 38 can be either a physically separate inductor or "built-in" to the power transformer T2 as a leakage inductance. In the embodiment shown in FIG. 1, transformer T2 has a step-up voltage characteristic to provide a high voltage for striking and maintaining current conduction through gas discharge lamp 14.

A current transducer or sensor 40 is coupled in series with gas discharge lamp 14. Current sensor 40 generates a feedback signal 42 which represents a current (i) delivered through lamp 14. Current sensor 40 can include a conventional current transformer, a Hall-effect transducer, a resistive element with an appropriate amplifier circuit, or any other type of current measuring transducer.

Referring back to the primary side of power transformer T2, phase control is provided through a pair of anti-parallel connected silicon controlled rectifiers (SCR's) 50 and 52 which are labeled "A" and "B". SCR's 50 and 52 are coupled in series with primary winding 30 to control the average AC power delivered to primary winding 30 and thus to gas discharge lamp 14. SCR 50 has its anode coupled to primary winding 30, its cathode coupled to input terminal 18 and its gate coupled to an "A" SCR trigger circuit 54. SCR 52 has its anode coupled to input terminal 18, its cathode coupled to primary winding 30 and its gate coupled to a "B" SCR trigger circuit 56. SCR 50 conducts current of the AC drive signal in the positive direction as defined by dots 57 shown on power transformer T2. SCR 52 conducts current of the AC drive signal in a negative direction. The SCR's can be substituted with other types of power switching devices, such as other thyristors or power transistors, but SCR's are preferred because of their low cost and high reliability.

The function of the rest of the circuit shown in FIG. 1 is primarily divided into a main current control feedback loop 58 and a current balance circuit 59. Main current control feedback loop 58 triggers SCR's 50 and 52 through their gates at the appropriate times to control a desired overall current delivered to lamp 14, while current balance circuit 59 maintains a correct balance of current between positive and negative half cycles in the AC drive signal.

A time reference circuit 60 is coupled to main current control feedback loop 58 for providing a time reference for triggering SCR's 50 and 52. Time reference circuit 60 includes a zero-crossing comparator 61, a monostable-multivibrator (one-shot) 62 and a ramp generator 64. Zero-crossing comparator 61 includes a non-inverting input 66, an inverting input 68 and an output 70. Non-inverting input 66 is coupled to secondary winding 22 of control transformer T1. Inverting input 68 is coupled to ground terminal 72. The voltage across secondary winding 22 of control transformer T1 is a scaled-down version of the AC drive signal. Therefore, zero-crossing comparator 61 provides a 60 Hz square wave on output 70 that is synchronized with the AC drive signal. The rise and fall edges of the square wave coincide with the zero crossings of the voltage in the AC drive signal.

The 60 Hz square wave output of zero-crossing comparator 61 drives a clock input 74 of one-shot 62. One-shot 62 triggers on both the positive and negative edges of the 60 Hz square-wave output. One-shot 62 provides an output signal on an output 76 which has a short duration on the order of tens of microseconds. One-shot 62 therefore provides a train of narrow pulses, where each pulse coincides with a zero crossing of the AC drive signal voltage.

The pulse train drives a reset input 78 of ramp generator 64. Ramp generator 64 generates a 120 Hz sawtooth-shaped voltage ramp on ramp generator output 80. The voltage ramp includes one ramp for each half cycle of the AC drive signal and therefore provides a time reference for each half cycle. In one embodiment, ramp generator 64 includes a current source, a capacitor and a reset circuit. The current source charges up the capacitor to a selected voltage level, while the reset circuit quickly discharges the capacitor back to a zero voltage level.

Time reference circuit 60 is coupled to SCR trigger circuits 54 and 56 through comparators 82 and 84, which are labeled "A" and "B". Comparator 82 includes first and second input terminals 86 and 88 and an output terminal 90. Comparator 84 includes first and second input terminals 92 and 94 and an output terminal 96. Ramp generator output 80 is coupled to input terminals 86 and 92 of comparators 82 and 84. Output terminals 90 and 96 are coupled to SCR trigger circuits 54 and 56, respectively. Comparators 82 and 84 provide timed trigger signals on outputs 90 and 96 to SCR trigger circuits 54 and 56 which are a function of the ramp voltage.

Input terminals 88 and 94 of comparators 82 and 84 receive adjustable DC threshold voltages from main current control feedback loop 58 which are compared with the ramp voltage provided on inputs 86 and 92. Once the ramp voltage rises to the DC threshold voltage, comparators 82 and 84 provide the trigger signals to SCR trigger circuits 54 and 56. Comparators 82 and 84 therefore generate the trigger signals after a selected phase delay during each half cycle of the AC drive signal.

The DC threshold voltages applied to input terminals 88 and 94 are inversely proportional to the output current that will be delivered to lamp 14. For example, a low voltage on input terminals 88 and 94 will intersect the ramp voltage on input terminals 86 and 92 early in the half cycle, resulting in an early trigger and a large conduction angle. A higher voltage on input terminals 88 and 94 will intersect the ramp voltage on input terminals 86 and 92 at a later time, resulting in a later trigger and a smaller conduction angle.

If the same DC threshold voltage were applied to comparator input terminals 86 and 92, comparators 82 and 84 would trigger at the same phase angle each half cycle. However, current balance circuit 59 adjusts the DC threshold voltage applied to input 92 relative to the DC threshold voltage applied to input 88 to compensate for any DC current component delivered to lamp 14.

Both comparators 82 and 84 deliver trigger signals each half cycle, even though only SCR 50 triggers on the positive half cycle, and only SCR 52 triggers on the negative half cycle. Rather than complicate the circuitry by blanking negative half cycle triggering of SCR 50 and blanking positive half cycle triggering of SCR 52, both SCR's are triggered each half cycle. Since the SCR's can only be gated in the forward direction, it is of no consequence that a trigger is delivered during reverse blocking. However, with other power switching devices, it may be preferable to blank the unused trigger signal.

The DC threshold voltage applied to comparator input terminal 88 is set by main current control feedback loop 58. Feedback loop 58 compares the current measured by current sensor 40 to a user-defined set point. Feedback loop 58 includes a rectifier and filter circuit 102, an intensity control circuit 104, an error amplifier 106 and a frequency compensation circuit 108. Rectifier and filter circuit 102 is coupled between current sensor 40 and non-inverting input 110 of error amplifier 106. Rectifier and filter circuit 102 processes the measured current within gas discharge lamp 14 by rectifying and filtering the current or performing some other root mean square (RMS)-to-DC conversion so that the signal provided to non-inverting input 110 of error amplifier 106 is a smooth DC voltage rather than a discontinuous AC signal.

Error amplifier 106 includes an inverting input 112 which is coupled to a tap 114 of a variable resistor 116. Variable resistor 116 can include a potentiometer, for example. Variable resistor 116 is coupled between a maximum reference voltage Vmax and ground terminal 72. Maximum reference voltage Vmax is generated by a well-known resistor ladder (not shown) which is coupled to voltage supply terminals 26 and 28 of DC power supply circuit 24. Other types of voltage sources can also be used to generate maximum reference voltage Vmax.

Tap 114 provides a DC voltage to error amplifier input terminal 112 which is representative of a desired current through lamp 14. Error amplifier 106 compares the desired current on input terminal 112 with the actual current on input terminal 110, and provides a voltage on output terminal 118 (the DC threshold voltage) which is proportional to the difference.

Error amplifier 106 is inverting since the actual current is provided to non-inverting input 110 and the desired current is provided to inverting input 112. The inversion performed by error amplifier 106 is cancelled by comparators 82 and 84 since the comparators are essentially inverting in that a lower threshold voltage results in more current and a higher threshold voltage results in lower current delivered through gas discharge lamp 14. The user can therefore adjust the intensity of gas discharge lamp 14 by adjusting the setting of tap 114.

Frequency compensation circuit 108 is coupled to output terminal 118 of error amplifier 106. Frequency compensation circuit 108 includes a loop compensation network that is commonly used in most feedback systems. Frequency compensation circuit 108 tailors the frequency response of error amplifier 106 to obtain a desired transient response and stability of the closed loop system. Frequency compensation circuit 108 can include a simple lag or lead-lag network, or can include a complete proportional-integral-differential (PID) compensation network.

The DC threshold voltage is applied directly to comparator 82 but is adjusted by a balance-compensation voltage before being applied to comparator 84. Current balance circuit 59 balances the current delivered to lamp 14 by adding or subtracting the balance-compensation voltage to or from the DC threshold voltage applied to comparator 84.

Current balance circuit 59 is coupled between current sensor 40 and input terminal 94 of comparator 84. Current balance circuit 59 includes an integrator 122, a sample and hold circuit 124, a summing amplifier 126 and a one-shot circuit 128. Integrator 122 is coupled between current sensor 40 and sample and hold circuit 124. One-shot circuit 128 is coupled between output terminal 70 of zero-crossing comparator 61 and a sample input 130 of sample and hold circuit 124. One-shot circuit 128 is a positive edge triggered one-shot which receives the square wave signal from zero-crossing comparator 66. One-shot circuit 128 provides a sample signal to sample and hold circuit 124 at the beginning of each cycle of the AC drive signal.

Sample and hold circuit 124 includes an output terminal 132 which is coupled to a negative input 134 of summing amplifier 126. Summing amplifier 126 includes a positive input 136 which is coupled to the output of frequency compensation circuit 108. Current balance circuit 59 slightly advances or delays the phase angle of comparator 84 through summing amplifier 126 to force an integral of the current delivered through gas discharge lamp 14 to zero.

Figure 2:
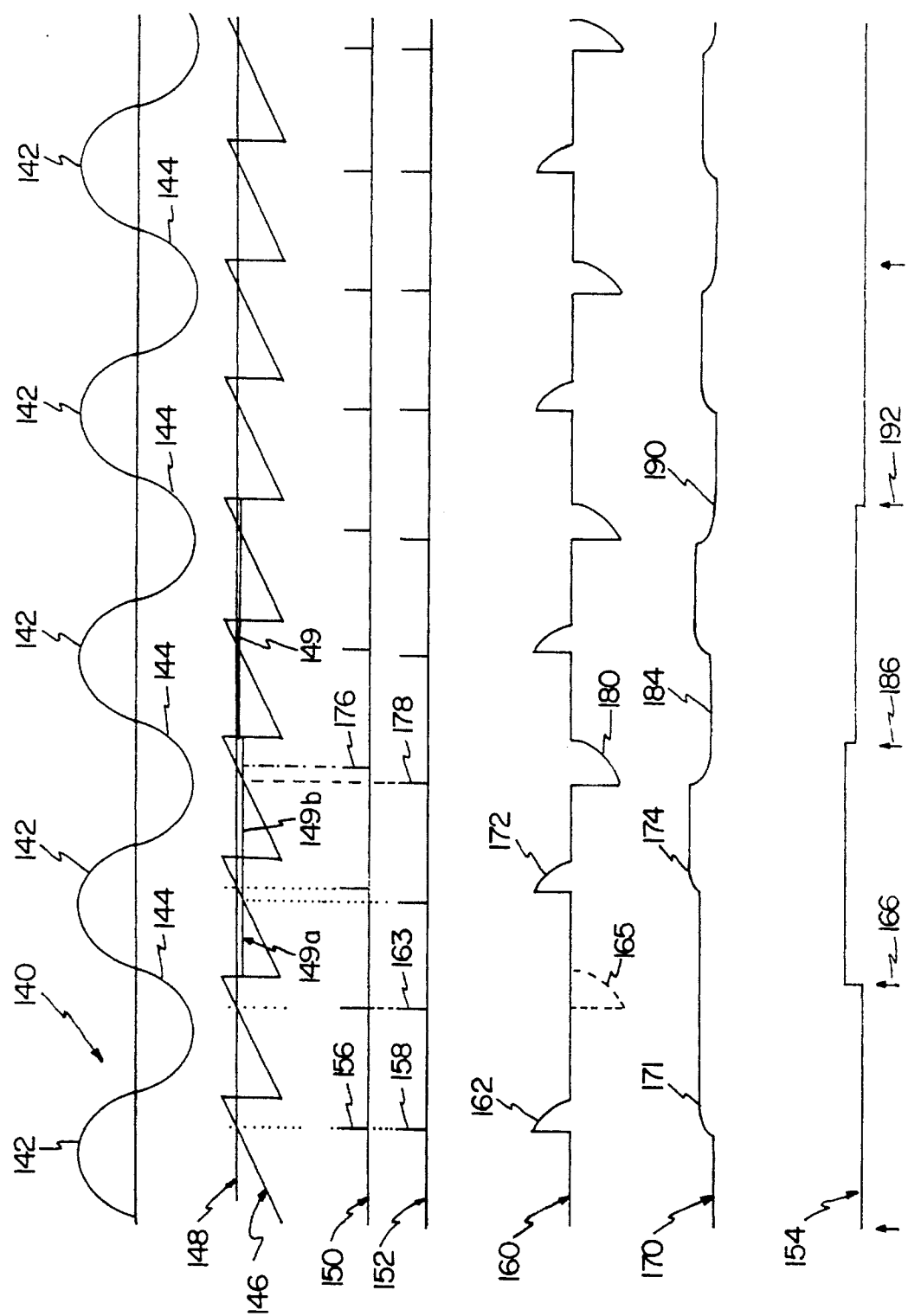
FIG. 2 is a timing diagram illustrating waveforms of various signals of the phase control circuit shown in FIG. 1.

Operation of current balance circuit 59 is described with reference to the timing diagram shown in FIG. 2. The timing diagram shown in FIG. 2 illustrates various waveforms in the phase control circuit shown in FIG. 1. Waveform 140, shown at the top of FIG. 2, illustrates the voltage of the AC drive signal provided by AC source 12. Waveform 140 includes a plurality of positive half cycles 142 and negative half cycles 144.

Waveform 146 illustrates the ramp voltage generated by ramp generator 64. The beginning and end of each ramp in waveform 146 corresponds to a zero crossing of waveform 140. There is one ramp for each half cycle of waveform 140. Threshold voltage waveform 148 is superimposed on ramp voltage waveform 146 and represents the DC threshold voltage applied to input terminal 88 of comparator 82. For simplicity, waveform 148 is shown as being constant across all five cycles of AC drive signal 140. In actual operation, waveform 148 could be slowly varying to adjust the total lamp current. Waveform 149 represents the DC threshold voltage applied by summing amplifier 126 to input 94 of comparator 84.

Waveform 150 represents the trigger signal provided by comparator 82 on output terminal 90. Waveform 152 represents the trigger signal generated by comparator 84 on output terminal 96. Waveform 154 represents the output of sample and hold circuit 124. When the output of sample and hold circuit 124 is zero (as it is during the first cycle at the beginning of the timing diagram), the DC threshold voltages for comparators 82 and 84 are equal to one another as shown by waveforms 148 and 149. When ramp voltage waveform 146 crosses threshold voltage waveforms 148 and 149, comparators 82 and 84 generate trigger pulses 156 and 158 on outputs 90 and 96, respectively. Waveform 160 represents the resulting current delivered through lamp 14.

In the second cycle of waveform 140, there are the DC threshold voltages differ from one another. Threshold voltage waveform 148 for comparator 82 does not change, but threshold voltage waveform 149 for comparator 84 drops slightly to threshold voltage 149a. Current balance circuit 59 adjusts the threshold voltage for comparator 84 as it updates sample and hold circuit 124 at the end of the first cycle of waveform 140.

The change in the threshold voltage can be understood through the following example. Suppose lamp 14 is starting out cold, and the phase angle for comparators 82 and 84 are equal. The phase angle slowly increases until lamp 14 begins conducting. Lamp 14 begins conducting during the first half cycle, at point 162, which corresponds to the triggering of SCR 50 by trigger pulse 156. During the negative half cycle, SCR 52 is triggered by a pulse 163, but current does not flow in lamp 14 because the lamp's operating point has shifted slightly. This can be seen by a missing current pulse 165 (shown in phantom) within waveform 160.

Integrator 122 integrates the resulting current delivered to lamp 14, which now has a DC component. Waveform 170 represents the output of integrator 122. Waveform 170 starts at zero and then integrates up to some small positive value 171 during the positive half cycle conduction. Since there is no corresponding negative half cycle conduction, the integrator remains at this positive value, which is then sampled and held at 166 as a compensation value for the next cycle.

During the second full cycle of waveform 140, comparator 82 works as before and current flows in the positive direction in lamp 14, as shown by current pulse 172 in waveform 160. Integrator output waveform 170 increases to a higher positive value 174. When the next negative half cycle begins, comparator 84 now has a lower threshold 149a than comparator 82, and therefore triggers at an earlier phase angle than comparator 82. The difference in phase angles is shown by the time difference between redundant trigger pulse 176 for comparator 82 and trigger pulse 178 of comparator 84. The earlier trigger pulse results in a higher voltage applied to lamp 14, and the lamp finally conducts in the negative direction, as shown by current pulse 180 in waveform 160. Because the phase angle is larger for comparator 84 than for comparator 82, the current waveform 160 has a larger area for negative current waveform pulse 180 than positive current waveform pulse 172. Integrator 122 therefore integrates down to a new value 184, which is not quite zero but still positive.

At the end of the second full cycle, at 186, sample and hold circuit 124 latches the new integrator value 184 and applies it as a compensation value to the threshold voltage of comparator 84. At the beginning of the third full cycle, threshold voltage 149b for comparator 84 is only slightly lower than threshold voltage 148 of comparator 82. Comparator 82 triggers as before and comparator 84 triggers with only a slightly longer phase angle. Integrator 122 integrates up during the positive half cycle, and down even more during the negative half cycle, ending up back at zero at the end of the third full cycle, as shown at 190. Once again, sample and hold circuit 124 latches the new value (zero) at 192 to balance the compensation summing node at summing amplifier 126.

The current delivered through lamp 14 is now balanced, and both phases once again conduct with equal phase angles. This process continues on a cycle-by-cycle basis, where integrator 122 keeps track of the net imbalance, and sample and hold circuit 124 latches a compensation value or correction value for the next cycle.

Integrator 122 does not need to be a perfect integrator, but can have a finite DC gain. This is generally desirable in practical applications in order to minimize problems associated with integrator drift. Integrator 122 can also include some frequency compensation in order to optimize transient response. Also, depending on the characteristics of lamp 14, the integrator time constant may be long enough to eliminate the need for a sample and hold circuit altogether. Either of these alternative embodiments still function to operate the phase control independently on each half cycle, to result in no net DC to the load.

It should be noted that the role of comparators 82 and 84 could be switched and still have the same result. That is, the positive half cycle could have the current balance circuit rather than the negative half cycle, or even both cycles could have complementary balance circuits. Numerous other circuit configurations can be used to adjust one or both of the phase delays independently of one another to limit DC current components from being delivered to the load. The circuit shown in FIG. 1 is provided only as an example.

The user intensity adjustment can be eliminated altogether or can be controlled by a control circuit. The control circuit can be coupled to a user interface or to a programmed computer for automatic control, for example. The control circuit can be used to ramp the lamp current down from a start level at ionization to a run level following ionization. The current profile of the ramp is preferably selected to optimize a lamp warm-up period and to maximize lamp life. The ramp can have various profiles, such as a slow ramp down, a quick ramp down, or a steady level followed by a ramp down.

In yet another alternative embodiment, ramp generator 64 and comparators 82 and 84 (shown in FIG. 1) are replaced with a programmed digital timing circuit which generates the trigger pulses at the appropriate times as a function of the threshold voltages generated by error amplifier 106 and summing amplifier 126. Other analog and digital timing circuits can also be used with the present invention.

CONCLUSION

The phase control circuit of the present invention provides independent half cycle phase control for driving non-linear AC loads, like gas discharge lamps. The phase control circuit allows simple, low-cost, infinitely adjustable intensity control of gas discharge lamps without the use of expensive and unreliable capacitors and mercury relay switches. Although the phase control circuit of the present invention is particularly useful for balancing current delivered to non-linear AC loads, the phase control circuit of the present invention can also be used in numerous other applications.

Conventional phase control without independent phase adjustments can be used for gas discharge lamps, provided that there is a capacitor in series with the lamp to eliminate any DC current components delivered to the lamp. However, since these capacitors are typically expensive and unreliable, it is preferable to have a phase control circuit which eliminates the need for these capacitors.

Although the present invention has been described with reference to preferred embodiments, workers skilled in the art will recognize that changes may be made in form and detail without departing from the spirit and scope of the invention.

What is claimed is:

1. A phase control circuit configured for controlling power delivered from an AC source to an AC load, wherein the AC source supplies an AC drive signal having a plurality of sequential positive and negative half cycles, the phase control circuit comprising:

first power switching means coupled between the AC source and the AC load for conducting current of the AC drive signal after a first phase delay during the positive half cycles;

second power switching means coupled between the AC source and the AC load for conducting current of the AC drive signal after a second phase delay during the negative half cycles;

means coupled to the first and second power switching means for determining the first and second phase delays;

means coupled to the AC load for determining a DC current component in the AC load and for generating a phase delay correction signal as a function of the DC current component; and means for adjusting at least one of the first and second phase delays independently of the other phase delay as a function of the phase delay correction signal to reduce the DC current component.

2. The phase control circuit of claim 1 wherein:

the first and second power switching means comprise first and second thyristors, respectively, which are connected anti-parallel to one another.

3. The phase control circuit of claim 1 wherein the means for determining the DC current component comprises:

current sensor means for sensing current delivered through the AC load; and integrator means for integrating the sensed current over each cycle of the AC drive signal and for generating the phase delay correction signal.

4. The phase control circuit of claim 3 wherein:

the means for determining the first and second phase delays comprises:
      a ramp voltage generator;
      a threshold voltage generator;
      a first trigger circuit coupled to one of the first and second power switching means;
      a second trigger circuit coupled to the other of the first and second power switching means;

a first comparator having a first input coupled to the ramp voltage generator, a second input coupled to the threshold voltage generator, and an output coupled to the first trigger circuit; and a second comparator having a first input, a second input and an output, wherein the first input is coupled to the ramp voltage generator, and the output is coupled to the second trigger circuit; and the means for adjusting comprises:
      a summing amplifier having a first summing input coupled to the integrator means, a second summing input coupled to the threshold generator and an output coupled to the second input of the second comparator.

5. The phase control circuit of claim 1 and further comprising:

means for adjusting the other of the first and second phase delays as a function of the phase delay correction signal.

6. A method of controlling the power delivered in an AC drive signal from an AC source to an AC load, comprising:

conducting current of the AC drive signal from the AC source to the AC load after a first phase delay during each positive half cycle of the AC drive signal;

conducting current of the AC drive signal from the AC source to the AC load after a second phase delay during each negative half cycle of the AC drive signal;

sensing current conducted to the AC load;

determining a DC current component in the sensed current; and adjusting at least one of the first and second phase delays independently of the other phase delay as a reduce the DC current component.

7. The method of claim 6 wherein:

determining the DC current component comprises integrating the sensed current over each cycle of the AC drive signal and generating a phase delay correction signal; and adjusting at least one of the first and second phase delays comprises adjusting at least one of the phase delays as a function of the phase delay correction signal.

8. The method of claim 6 and further comprising:

comparing the sensed current with a user defined set point and generating a comparison signal;

wherein determining the DC current component comprises integrating the sensed current over each cycle of the AC drive signal and generating a phase delay correction signal; and adjusting at least one of the first and second phase delays comprises adjusting at least one of the phase delays as a function of the comparison signal and the phase delay correction signal.

9. The method of claim 8 wherein adjusting at least one of the first and second phase delays comprises:

adjusting the other of the first and second phase delays as a function of the comparison signal.

10. The method of claim 8 wherein adjusting one of the first and second phase delays comprises:

adjusting both of the first and second phase delays as a function of the comparison signal and the phase delay correction signal.

11. A phase control circuit configured for controlling power delivered from an AC source to an AC load, wherein the AC source supplies an AC drive signal having a plurality of sequential positive and negative half cycles and the AC load has a current level with a DC current component, the phase control circuit comprising:

- a first power switching device coupled between the current source and the load, which is adapted to conduct current after a first phase delay during the positive half cycles in response to a first phase delay signal;
- a second power switching device coupled between the current source and the load, which is adapted to conduct current after a second phase delay, independently of the first phase delay, during the negative half cycles in response to a second phase delay signal;
- a current sensor having a sensor input coupled to the AC load and having a sensor output, wherein the current sensor generates a measurement signal on the sensor output which is representative of the current level through the AC load;
- a DC detector circuit having a detector input coupled to the sensor output and having a detector output, wherein the DC detector circuit generates a DC level signal on the detector output which represents the DC current component in the AC load;
- a balance circuit having a balance input and a balance output, with the balance input coupled to the detector output, wherein the balance circuit generates a balance signal on the balance output as a function of the DC level signal; and
- a trigger circuit coupled between the balance circuit and the first and second power switching devices, which triggers conduction of the first and second power switching devices after the first and second phase delay signals, respectively, wherein at least one of the first and second phase delay signals is a function of the balance signal.

12. The phase control circuit of claim 11 wherein the DC detector circuit comprises an integrator.

13. A phase control circuit configured for controlling power delivered from an AC source to an AC load, the phase control circuit comprising:

- first and second anti-parallel connected thyristors coupled between the AC current source and the AC load, wherein each thyristor includes a gate;
- a first trigger circuit coupled to the gate of one of the first and second thyristors;
- a second trigger circuit coupled to the gate of the other of the first and second thyristors;
- a current sensor coupled to the AC load;
- an integrator having an input coupled to the current sensor and having an output;
- a threshold voltage generator;
- a summing amplifier having first and second summing inputs and having an output, with the first summing input coupled to the integrator output and the second summing input coupled to the threshold voltage generator;
- a ramp generator;
- a first comparator having a first input coupled to the ramp generator, a second input coupled to the threshold voltage generator, and an output coupled to the first trigger circuit; and
- a second comparator having a first input coupled to the ramp generator, a second input coupled to the summing amplifier output, and an output coupled to the second trigger circuit.

14. A gas discharge lamp control circuit, which is configured for receiving an AC drive signal from an AC source having a plurality of sequential positive and negative half cycles from an AC source, the gas discharge lamp control circuit comprising:

- input terminals which are adapted to be coupled to the AC source;
- a gas discharge lamp;
- a ballast coupled to the gas discharge lamp;
- a current sensor coupled in series with the gas discharge lamp;
- first and second anti-parallel connected thyristors coupled in series with the ballast, wherein each thyristor includes a gate;
- means coupled to the gate of the first thyristor for triggering the first thyristor after a first phase delay during the positive half cycles of the AC drive signal;
- means coupled to the gate of the second thyristor for triggering the second thyristor after a second phase delay during the negative half cycles of the AC drive signal;
- an integrator having an input coupled to the current sensor and having an output; and
- means coupled to the integrator output for adjusting at least one of the first and second phase delays independently of the other phase delay as a function of the integrator output.

* * * * *

UNITED STATES PATENT AND TRADEMARK OFFICE
CERTIFICATE OF CORRECTION

PATENT NO. : 5,578,908
DATED : November 26, 1996
INVENTOR(S) : Eric G. Persson

It is certified that error appears in the above-indentified patent and that said Letters Patent is hereby corrected as shown below:

Col. 10, line 32, please insert --function of the DC current component to-- before "reduce".

Signed and Sealed this

Twenty-ninth Day of April, 1997

*Attest:*

BRUCE LEHMAN

*Attesting Officer*     Commissioner of Patents and Trademarks